US012696272B2

(12) United States Patent
Park et al.

(10) Patent No.: US 12,696,272 B2
(45) Date of Patent: Jul. 28, 2026

(54) METHOD FOR TRANSMITTING CONTENTION-BASED DATA IN NON-TERRESTRIAL-NETWORK-BASED COMMUNICATION SYSTEM, AND ELECTRONIC DEVICE FOR PERFORMING SAME

(71) Applicant: Samsung Electronics Co., Ltd., Suwon-si (KR)

(72) Inventors: Seungil Park, Suwon-si (KR); Sunhyun Kim, Suwon-si (KR); Byounghoon Jung, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 18/564,238

(22) PCT Filed: May 11, 2022

(86) PCT No.: PCT/KR2022/006740
§ 371 (c)(1),
(2) Date: Nov. 27, 2023

(87) PCT Pub. No.: WO2022/255680
PCT Pub. Date: Dec. 8, 2022

(65) Prior Publication Data
US 2024/0260033 A1 Aug. 1, 2024

(30) Foreign Application Priority Data

Jun. 1, 2021 (KR) ........................ 10-2021-0070960

(51) Int. Cl.
*H04W 72/1268* (2023.01)
*H04W 72/0446* (2023.01)
(Continued)

(52) U.S. Cl.
CPC ... *H04W 72/1268* (2013.01); *H04W 72/0446* (2013.01); *H04W 72/21* (2023.01); *H04W 84/06* (2013.01)

(58) Field of Classification Search
CPC . H04W 72/0446; H04W 72/21; H04W 72/23; H04W 28/0278; H04W 72/1268
See application file for complete search history.

(56) References Cited

U.S. PATENT DOCUMENTS 6,522,635 B1    2/2003  Bedwell
8,345,585 B2    1/2013  De Jaeger et al.
(Continued)

FOREIGN PATENT DOCUMENTS

KR    10-2016-0056771 A    5/2016
KR    10-2016-0108829 A    9/2016
(Continued)

OTHER PUBLICATIONS

International Search Report dated Aug. 17, 2022, issued in International Application No. PCT/KR2022/006740.
(Continued)

*Primary Examiner* — Shukri Taha
(74) *Attorney, Agent, or Firm* — Jefferson IP Law, LLP

(57) ABSTRACT

According to an embodiment of the disclosure, a method by which a user equipment (UE) transmits uplink (UL) data to a base station (BS) to handle traffic which occurs in a communication system includes obtaining, from the BS, resource map information relating to an available contention-based resource, transmitting, to the BS, a scheduling request message, control information and at least a portion of the UL data based on the resource map information, and determining whether the at least a portion of the UL data is successfully transmitted, wherein the control information (Continued)

includes information relating to a contention-based resource used to transmit the at least a portion of the UL data.

17 Claims, 18 Drawing Sheets

(51) Int. Cl.
H04W 72/21 (2023.01)
H04W 84/06 (2009.01)

(56) References Cited

U.S. PATENT DOCUMENTS

| | | | |
|---|---|---|---|
| 9,872,313 B2 | 1/2018 | Dabeer et al. | |
| 10,667,283 B2* | 5/2020 | Cao | H04W 72/12 |
| 10,772,124 B2 | 9/2020 | Seo et al. | |
| 10,903,944 B2 | 1/2021 | et al. | |
| 11,638,242 B2 | 4/2023 | Lee et al. | |
| 12,317,278 B2* | 5/2025 | Khoshkholgh Dashtaki | |
| | | | H04W 72/23 |
| 2012/0294270 A1 | 11/2012 | Yamada et al. | |
| 2015/0327245 A1 | 11/2015 | Zhu et al. | |
| 2017/0013610 A1 | 1/2017 | Lee et al. | |
| 2017/0290042 A1* | 10/2017 | Islam | H04W 72/52 |
| 2018/0152950 A1 | 5/2018 | Xiong et al. | |
| 2018/0270803 A1 | 9/2018 | Kwak et al. | |
| 2019/0306879 A1 | 10/2019 | Seo et al. | |
| 2020/0120649 A1* | 4/2020 | Nimbalker | H04W 74/02 |
| 2022/0201765 A1* | 6/2022 | Huang | H04W 28/0278 |
| 2024/0080750 A1* | 3/2024 | Wei | H04W 48/12 |

FOREIGN PATENT DOCUMENTS

| | | | |
|---|---|---|---|
| KR | 10-2017-0063640 A | 6/2017 | |
| WO | 2017/052320 A1 | 3/2017 | |

OTHER PUBLICATIONS

European Search Report dated Sep. 10, 2024, issued in European Application No. 22816339.0.

Korean Office Action dated Feb. 10, 2026, issued in Korean Patent Application No. 10-2021-0070960.

* cited by examiner

SR TRANSMISSION (CONTROL+DATA)
TRANSMISSION

DATA OCCUR 21   22   10

120

110

■ : 11
▨ : 12a
▨ : 12b
▨ : 13
☐ : 14

METHOD FOR TRANSMITTING CONTENTION-BASED DATA IN NON-TERRESTRIAL-NETWORK-BASED COMMUNICATION SYSTEM, AND ELECTRONIC DEVICE FOR PERFORMING SAME

TECHNICAL FIELD

The disclosure relates to a method of transmitting contention-based data in a non-terrestrial network based communication system and electronic device for performing the method.

BACKGROUND ART

Looking back through successive generations at a process of development of radio communication, technologies for human-targeted services such as voice, multimedia, data or the like have been developed. Connected devices that have been explosively increasing after the commercialization of fifth-generation (5G) communication systems are expected to be connected to communication networks. As examples of things connected to networks, there may be cars, robots, drones, home appliances, displays, smart sensors installed in various infrastructures, construction machinery, factory equipment, etc. Mobile devices are expected to evolve into various form factors such as augmentation reality (AR) glasses, virtual reality (VR) headsets, hologram devices, and the like. In order to provide various services by connecting hundreds of billions of devices and things in the sixth-generation (6G) era, there are ongoing efforts to develop better 6G communication systems. For these reasons, 6G communication systems are referred to as beyond-5G systems.

In the 6G communication system, the highest transfer rate is about 1 tera (i.e., 1,000 giga) bps and wireless delay is about 100 microseconds ($\mu$sec). In other words, compared to the 5G communication system, the transfer rate becomes 50 times faster and the wireless delay is reduced to a tenth ($\frac{1}{10}$) in the 6G communication system.

To attain these high data transfer rates and ultra-low delay, the 6G communication system is considered to be implemented in the terahertz (THz) band (e.g., ranging from 95 giga hertz (GHz) to 3 THz). Due to the more severe path loss and atmospheric absorption phenomenon in the THz band as compared to the millimeter wave (mm Wave) band introduced in 5G systems, importance of technology for securing a signal range, i.e., coverage, is expected to grow. As major technologies for securing coverage, radio frequency (RF) elements, antennas, new waveforms superior to orthogonal frequency division multiplexing (OFDM) in terms of coverage, beamforming and massive multiple-input and multiple-output (massive MIMO), full dimensional MIMO (FFD-MIMO), array antennas, multiple antenna transmission technologies such as large-scale antennas, etc., need to be developed. Besides, new technologies for increasing coverage of THz band signals, such as metamaterial based lenses and antennas, a high-dimensional spatial multiplexing technique using orbital angular momentum (OAM), reconfigurable intelligent surface (RIS), etc., are being discussed.

Furthermore, in order to enhance frequency efficiency and system networks, a full duplex technology by which both uplink and downlink transmissions use the same frequency resource at the same time, a network technology that comprehensively uses satellite and high-altitude platform stations (HAPS) and the like, a network structure innovation technology supporting mobile base stations and allowing optimization and automation of network operation, a dynamic spectrum sharing technology through collision avoidance based on spectrum usage prediction, an artificial intelligence (AI) based communication technology to realize system optimization by using AI from the designing stage and internalizing an end-to-end AI supporting function, a next generation distributed computing technology to realize services having complexity beyond the limit of terminal computing capability by using ultrahigh performance communication and computing resources (e.g., mobile edge computing (MEC) cloud) are being developed in the 6G communication system. In addition, by designing new protocols to be used in 6G communication systems, developing mechanisms for implementing a hardware-based security environment and safe use of data, and developing technologies for protecting privacy, attempts to strengthen connectivity between devices, further optimize the network, promote softwarization of network entities, and increase the openness of wireless communication are continuing.

With such research and development of the 6G communication system, it is expected that new levels of the next hyper-connected experience become possible through hyper-connectivity of the 6G communication system including not only connections between things but also connections between humans and things. Specifically, it is predicted that services such as truly immersive extended reality (truly immersive XR), high-fidelity mobile hologram, digital replication, etc., may be provided. Furthermore, services such as remote surgery, industrial automation and emergency response with enhanced security and reliability may be provided through the 6G communication system to be applied in various areas such as industry, medical care, vehicles, appliances, etc.

In a terrestrial based mobile communication system, a user equipment (UE) may access a nearby base station (BS) among multiple BSs installed in a service area to use a communication service. A fourth generation (4G) or 5G BS is designed to guarantee connectivity to a UE within a range of up to 100 kilometers (km), but for smoother services, a sufficient number of BSs are installed to secure connectivity to a UE within a few kilometers. Considering a communication range of up to 100 km, as much as 0.03 ms of propagation delay occurs, and for a normal communication range, the propagation delay has a much smaller value. In the 4G or 5G communication system, for organic operation between the BS and the UE, the UE may operate in sync with the BS, and accordingly, a processing delay may occur when the UE transmits data after being signaled from the BS. To prevent the processing and propagation delays in the 4G or 5G mobile communication system, the signaling operation of the BS and an actual transmission procedure of the UE may be operated with a time gap in between, and it may be commonly assumed that the time gap has about 1 to 4 milliseconds (ms). As the terrestrial based mobile communication system has an environment in which the processing delay is much longer than the propagation delay, the time gap is mainly set to a similar value to a maximum value of the processing delay.

Standardization of non-terrestrial based mobile communication systems that use 5G new radio (NR) technology and satellites has recently been started. The non-terrestrial based mobile communication technology is also deemed to be used in next-generation (e.g., 6G) mobile communication systems. In a case of low-earth-orbiting satellites, as a distance between the UE and the satellite is up to 2,157 km (on the assumption that the satellite altitude is 700 km and the elevation angle is 10 degrees), up to 7.2 milliseconds (ms) of propagation delay may occur. Furthermore, when the low-earth-orbiting satellite only performs a simple role as a relay for signals transmitted from a terrestrial gateway, the propagation delay of up to 7.2 ms from the low-earth-orbiting satellite to the terrestrial gateway needs to be considered as well. Hence, a maximum propagation delay from the UE to the terrestrial gateway via the satellite may amount to 14.4 ms. Moreover, the maximum propagation delay may grow further according to the actual altitude of the satellite. As such, the value of the propagation delay between the UE and the BS may be very big when the non-terrestrial based mobile communication technology is used. A BS as herein used refers to the satellite when the satellite has a BS function, or may refer to a terrestrial gateway that serves as a BS in the terrestrial network when the satellite only serves as a simple relay without having the BS function. Furthermore, in the non-terrestrial communication, reception performance may be very low due to the long communication distance between the UE and the satellite. Hence, the non-terrestrial communication may have very low transfer rates, and is expected to be used for transferring constantly generated low-volume data such as voice, or low-volume one-time information such as text, Internet of things (IoT) sensing information, etc.

DISCLOSURE

Technical Problem

When the non-terrestrial communication uses a scheduling-based data transfer method that is mainly used in the existing terrestrial based mobile communication system, scheduling delays may be very large. In this regard, the existing scheduling-based data transfer method in the non-terrestrial communication will be described with reference to FIG. 12. Referring to FIG. 12, a user equipment (UE) 110 may be allocated a resource to transmit data by signaling with a base station (120) and may use the allocated resource to transmit data.

When data to be transmitted occurs following the occurrence of traffic, the UE 110 may transmit a scheduling request (SR) message to the BS 120. The UE 110 may notify the BS 120 of the occurrence of data to be transmitted by transmitting the SR message. The SR message corresponds to control information of very small size (e.g., 1 bit) and may be transmitted using a resource periodically allocated by the BS120 for the UE 110 to transmit the SR message.

When the BS 120 receives the SR message from the UE 110, the BS 120 may not know a required amount of resource, and may thus allocate a resource for buffer status report (BSR) to figure out a traffic condition of the UE 110. The UE 110 may use the allocated resource to request a required amount of resource for data transmission from the BS 120, and the BS 120 may then figure out the resource requirement of the UE 110.

The BS 120 may allocate a suitable resource to the UE 110 after receiving the BSR from the UE 110, and the UE 110 may use the allocated resource to transmit, to the BS 120, data from traffic that may occur.

With this procedure, a scheduling delay from when the traffic occurs to when the UE 110 starts to transmit data from the traffic may occur. When there is a significant distance between the BS 120 and the UE 110 as in the non-terrestrial communication, the scheduling delay may grow very large, which may cause inefficiency in the communication system.

Technical Solution

According to an embodiment of the disclosure, a method by which a user equipment (UE) transmits uplink (UL) data to a base station (BS) to handle traffic which occurs in a communication system includes obtaining, from the BS, resource map information relating to an available contention-based resource, transmitting, to the BS, a scheduling request message, control information and at least a portion of the UL data based on the resource map information, and determining whether the at least a portion of the UL data is successfully transmitted, wherein the control information includes information relating to a contention-based resource used to transmit the at least a portion of the UL data.

According to an embodiment of the disclosure, a method by which a BS performs scheduling for UL data transmission of a UE in a communication system includes transmitting, to the UE, resource map information relating to an available contention-based resource, receiving, from the UE, a scheduling request message, determining whether each of control information and at least a portion of the UL data is received, and determining whether to allocate a resource for the UE based on whether the control information is received and whether the at least a portion of the UL data is received, wherein the control information includes information relating to a contention-based resource determined to be used by the UE to transmit the at least a portion of the UL data.

According to an embodiment of the disclosure, a UE for transmitting, to a BS, UL data to process traffic generated in a communication system includes a transceiver configured to transmit the UL data to the BS, and at least one processor coupled to the transceiver, the at least one processor configured to obtain, from the BS, resource map information relating to an available contention-based resource, transmit, to the BS, a scheduling request message, control information and at least a portion of the UL data based on the resource map information, and determine whether the at least a portion of the UL data is successfully transmitted, wherein the control information includes information relating to a contention-based resource used to transmit the at least a portion of the UL data.

Advantageous Effects

According to embodiments of the disclosure, scheduling delay may be reduced in uplink data transmission of a user equipment (UE). This may lead to an increase in efficiency of a communication system. In addition, various advantages figured out directly or indirectly throughout the specification may be provided.

DESCRIPTION OF DRAWINGS

Like reference numerals may be used for like elements throughout the drawings.

MODE FOR INVENTION

Figure 1:
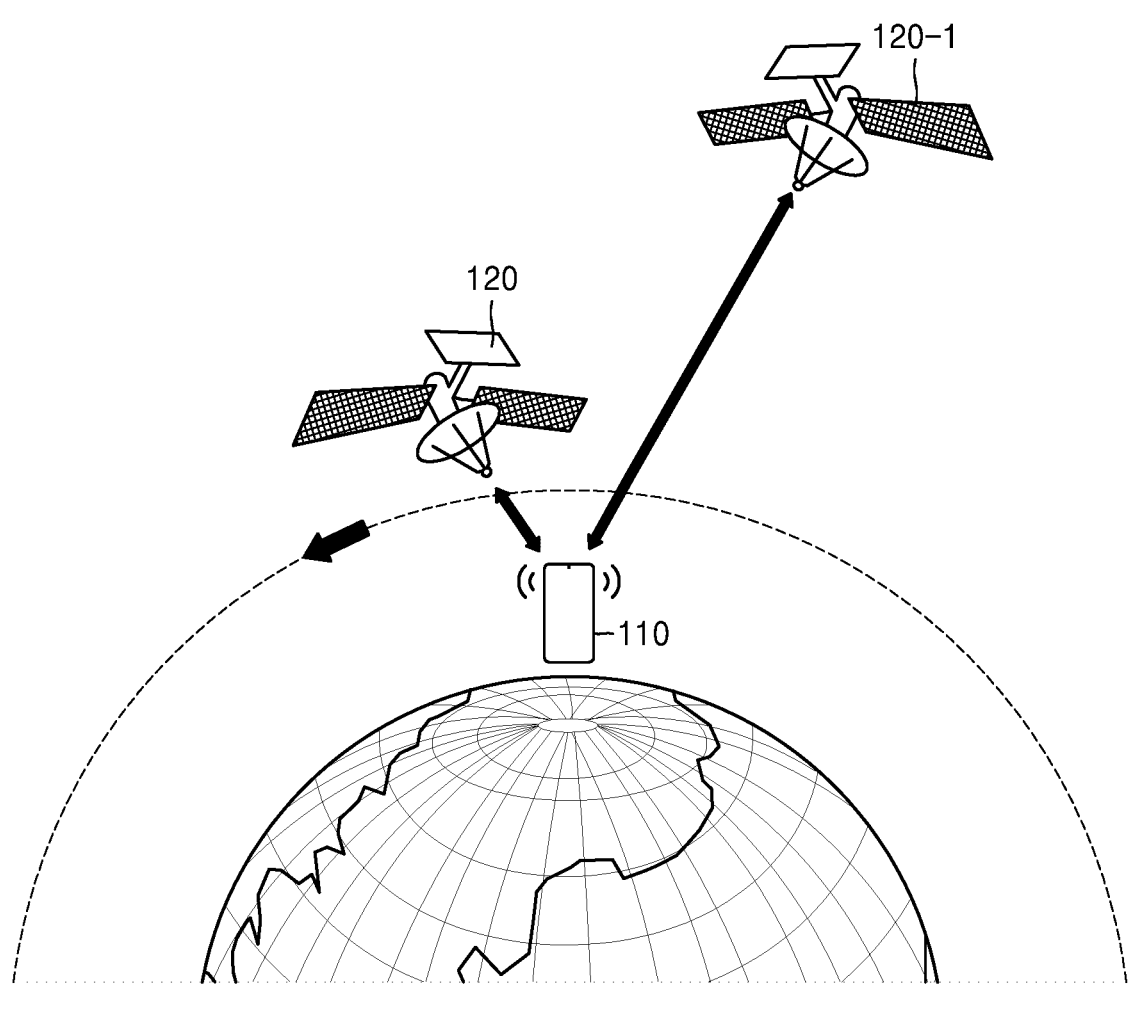
FIG. 1 illustrates a non-terrestrial communication system, according to an embodiment.

FIG. 1 illustrates a non-terrestrial communication system, according to an embodiment.

Referring to FIG. 1, the non-terrestrial communication system may include a user equipment (UE) 110 and base stations (BSs) 120 and 120-1. In various embodiments, the UE 110 may form the non-terrestrial communication system with the low-earth-orbiting first BS 120, and form the non-terrestrial communication system with the high-earth-orbiting second BS 120-1 as well.

The first BS 120 may be a low earth orbit (LEO) satellite that revolves around the earth at an altitude of about 200 to 2,000 km from the earth. The first BS 120 may revolve at 6.9 to 7.8 km/s with respect to the earth. A distance between the first BS 120 and the UE 110 may vary as the first BS 120 revolves. Hence, the delay occurring when the UE 110 in communication with the first BS 120 transmits data may vary by the location of the first BS 120.

The second BS 120-1 may be a geostationary orbit (GEO) satellite that revolves around the earth at an altitude of about to 35,786 km from the earth. The second BS 120-1 may appear like it is stationary with respect to the earth. Specifically, the second BS 120-1 may revolve the same angle as the earth rotates and thus look as if it stays at the same location all the time. Accordingly, the distance between the second BS 120-1 and the UE 110 may always be constant, and the delay that occurs when the data is transmitted from the UE 110 in communication with the second BS 120-1 may be constant regardless of the location of the second BS 120-1.

As the GEO satellites have reached a saturation point these days, demand for a satellite communication scheme using the LEO satellite such as the first BS 120 increases. Although the BSs 120 and 120-1 and the UE 110 will now be described by focusing on the first BS 120 for convenience of explanation, it is obvious to those of ordinary skill in the art that the description of the first BS 120 will be equally or similarly applied to the second BS 120-1.

Figure 2:
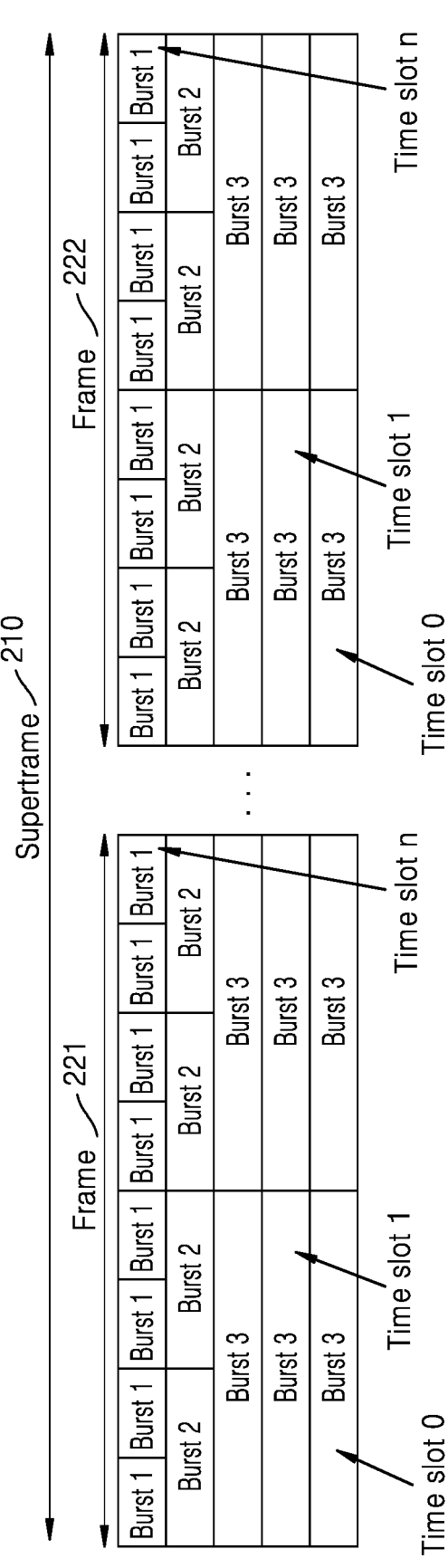
FIG. 2 illustrates a resource structure based on a non-terrestrial communication technology standard, according to an embodiment.

FIG. 2 illustrates a resource structure based on a non-terrestrial communication technology standard, according to an embodiment.

Referring to FIG. 2, a plurality of frames 221 and 222 are illustrated for a contention-based resource structure according to the non-terrestrial communication technology standard DVB-RCS2. In the DVB-RCS2, the BS may define a traffic burst having a different structure for each frame 221 or 222, and a time slot number may be set to each traffic burst. In the DVB-RCS2, the frames 221 and 222 may have various structures, and a plurality of frames 221 and 222 repeated in the same structure may constitute a superframe 210.

The superframe 210 may be about 25 to 750 ms long, and the BS may notify the UE of whether a traffic burst corresponding to each time slot of the frames 221 and 222 in each superframe 210 is a resource used on a contention basis. For example, the BS may transmit, to the UE, information about a contention-based resource that is available to the UE in each superframe 210. With this, the UE may identify for each superframe 210 the presence of a traffic burst included in the superframe 210, and figure out whether each traffic burst is a resource available based on a contention basis.

Accordingly, the UE in which traffic occurs may try data transmission in the contention-based resource without scheduling. The scheme for transmitting data in the contention-based resource may be efficient to transmit low-volume one-time information.

In this specification, disclosed are various embodiments of a method by which the UE transmits uplink (UL) data by efficiently using the contention-based resource as described above. With the embodiments, the scheduling delay of the UE may be reduced and efficiency of the communication system may increase.

Figure 3:
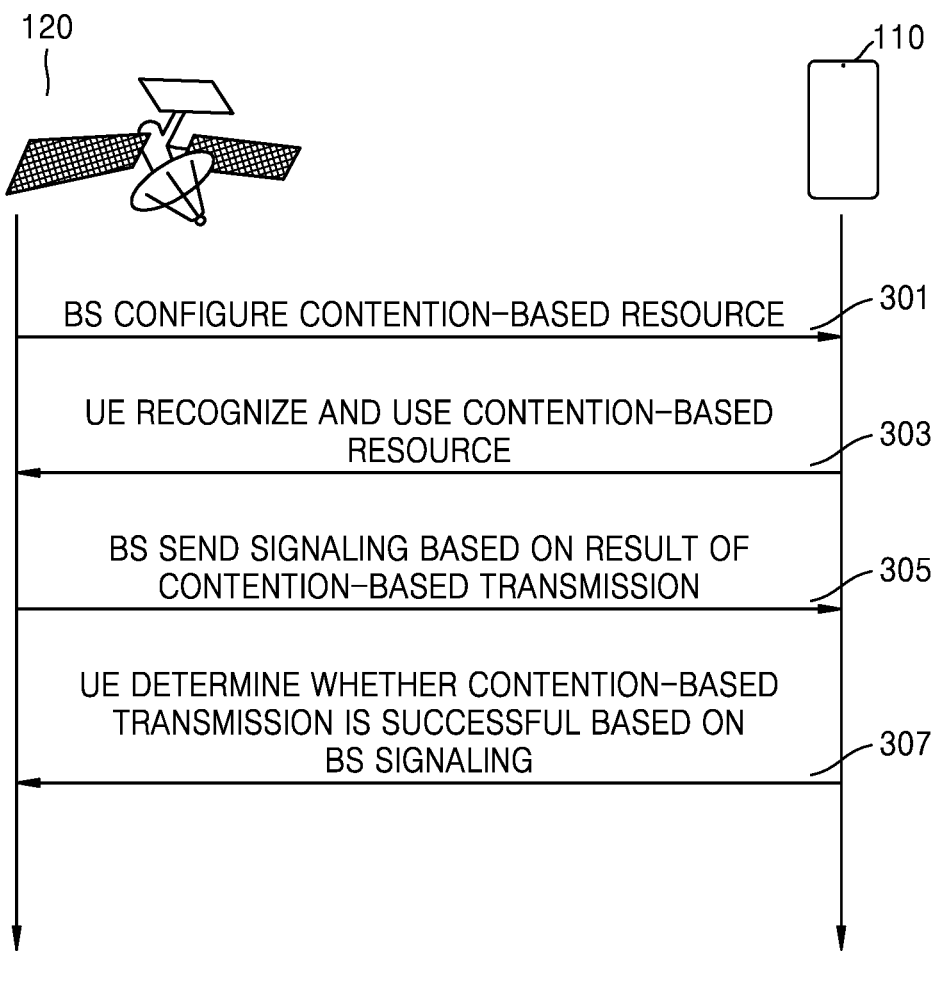
FIG. 3 is a sequence chart illustrating a method by which a user equipment (UE) transmits uplink (UL) data to a base station (BS), according to an embodiment.

FIG. 3 is a sequence chart illustrating a method by which a UE transmits UL data to a BS, according to an embodiment.

Referring to FIG. 3, the method by which the UE 110 transmits UL data to the BS 120 may include operations 301 to 307. In various embodiments, the method is not limited to what is shown in FIG. 3 and may add an additional operation not shown in FIG. 3, or some of the operations shown in FIG. 3 may be omitted. Furthermore, what are indicated by arrows in FIG. 3 is not necessarily considered as indicating transmission of information or signals.

In operation 301, the BS 120 may configure a contention-based resource. For example, the BS 120 may generate resource map information relating to information about an available contention-based resource, and transmit the resource map information to the UE 110. The resource map information may include information about a location, a region, a size, or the like of a resource available to the UE 110 as the contention-based resource among designated resources.

In operation 303, the UE 110 may recognize and use the contention-based resource. For example, the UE 110 may obtain the information about a location, region or size of the available contention-based resource based on the resource map information obtained from the BS 120 in operation 301.

In an embodiment, the UE 110 may determine the location, region or size of a resource to be used to send a scheduling request message. In an embodiment, the UE 110 may determine the location, region or size of a resource to be used to transmit UL data to handle traffic that may occur. In an embodiment, the UE 110 may determine the location, region or size of a resource to be used to transmit control information for UL data transmission. In an embodiment, the control information may include information about the location, region or size of the resource to be used by the UE 110.

With this, the UE 110 may use a contention-based resource to transmit, to the BS 120, at least a portion of the UL data, the control information and the scheduling request message, based on the obtained resource map information. In an embodiment, the UE 110 may transmit, to the BS 120, the at least a portion of the UL data, the control information and the scheduling request message through the same signaling. For example, the UE 110 may send the BS 120 the at least a portion of the UL data, the control information and the scheduling request message at the same time.

In operation 305, the BS 120 may perform proper signaling according to a result of contention-based transmission of the UE 110. In various embodiments, the BS 120 may succeed in receiving all the scheduling request message, the control information and the at least a portion of the UL data transmitted by the UE 110 in operation 303 or fail to receive them all. In various embodiments, the BS 120 may succeed in receiving only some of the scheduling request message, the control information and the at least a portion of the UL data transmitted by the UE 110 in operation 303 and fail to receive the others.

In various embodiments, the BS 120 may determine information to be transmitted to the UE 110 based on the information successfully received from the UE 110. For example, when the BS 120 succeeds in receiving only the scheduling request message, the BS 120 may allocate a resource for transmitting a buffer status report (BSR) so as to receive the BSR from the UE 110. In another example, when the BS 120 succeeds in receiving all the scheduling request message, the control signal and the at least a portion of the UL data, the BS 120 may transmit acknowledgment (ACK) to indicate a success of reception of the UL data. As such, the BS 120 may determine signaling for the UE 110 based on the successfully received information and perform the determined signaling. Specific embodiments of operation 305 will be described in detail in connection with FIGS. 6A to 6D.

In operation 307, the UE 110 may determine whether the contention-based transmission (i.e., the transmission performed in operation 303) of the UE 110 is successful, according to the signaling of the BS 120 performed in operation 305. For example, when the BS 120 only allocates a resource for transmitting the BSR, the UE 110 may determine that transmission of only the scheduling request message of the information transmitted in operation 303 is successful and that transmission of the control information and the at least a portion of the UL data has failed. In another example, when the BS 120 transmits ACK, the UE 110 may determine that transmission of all the information transmitted in operation 303 is successful. In various embodiments, the UE 110 may perform additional signaling for the BS 120 or terminate the procedure depending on whether the transmission of the information transmitted in operation 303 is successful. Specific embodiments of operation 307 will be described in detail in connection with FIGS. 7A to 7D.

Figure 4:
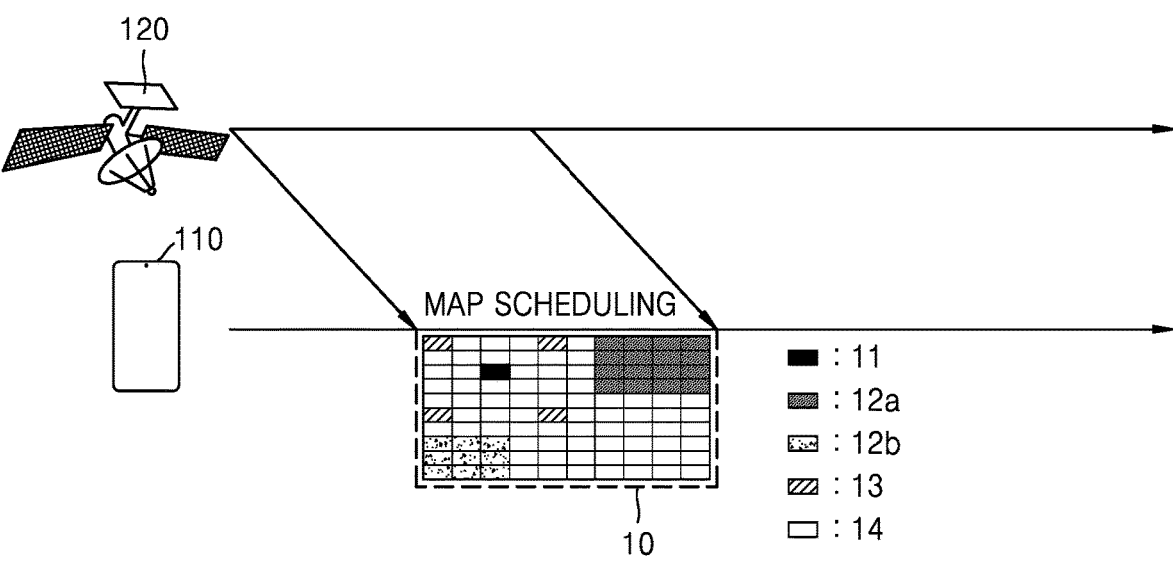
FIG. 4 illustrates transmission of resource map information, according to an embodiment.

FIG. 4 illustrates transmission of resource map information, according to an embodiment.

Referring to FIG. 4, the BS 120 may transmit resource map information relating to a contention-based resource available to the UE 110. In various embodiments, transmitting, by the BS 120, the resource map information may be understood as being the same as or similar to attempting, by the BS 120, scheduling-based on the resource map information, and thus understood as being the same as or similar to performing, the BS 120, map scheduling.

In an embodiment, the BS 120 may transmit the resource map information to the UE 110 periodically or non-periodically. For example, the BS 120 may transmit the resource map information to the UE 110 periodically at designated time intervals. In another example, the BS 120 may transmit the resource map information to the UE 110 non-periodically in response to a certain condition satisfied. For example, when a condition is satisfied, e.g., there is a request of the UE 110 or a contention-based resource has at least a set size, the BS 120 may transmit the resource map information to the UE 110.

In an embodiment, the resource map information may include information about a whole size of a dedicated resource area 10 (e.g., a time range or a frequency range) and a plurality of resources included in the dedicated resource area 10. For example, the resource map information may include information about a location, usage, availability, etc., of each of the plurality of resources included in the designated resource area 10.

In various embodiments, a scheduling request resource 11, a resource 12a occupied by a first UE, a resource 12b occupied by a second UE, a contention-based control resource 13, and a contention-based data resource 14 may be included in the designated resource area 10.

In an embodiment, it may be understood that the first UE and the second UE are different from the UE 110, and that the resource 12a occupied by the first UE and the resource 12b occupied by the second UE are contention-based resources that are unavailable to the UE 110. In various embodiments, unlike what is shown in FIG. 4, the resource 12a occupied by the first UE and/or the resource 12b occupied by the second UE may not be included in the designated resource area 10 depending on conditions of the first UE and the second UE. Furthermore, unlike what is shown in FIG. 4, a resource occupied by an additional UE may be included in the designated resource area 10. The scheduling request resource 11 is a resource allocated in advance by the BS 120 for each UE (e.g., the UE 110), and may be understood as a resource used for requesting a resource when traffic occurs in the UE. In an embodiment, the scheduling request resource 11 and resources 12a and 12b occupied by other UEs may be indicated or configured as contention-based resources unavailable to the UE 110.

In an embodiment, the contention-based control resource 13 may be understood as a resource for transmitting control information. In an embodiment, the control information may include information about a contention-based resource used for UL data transmission, and include other information (e.g., a BSR) required for UL data transmission. In an embodiment, the information about a contention-based resource used for UL data transmission may be understood as self-scheduling (SS) information. In an embodiment, the SS information may include identification (ID) of the UE 110, a location of the contention-based data resource 14 to be used by the UE 110, modulation and coding scheme (MCS) information, etc.

In various embodiments, the BS 120 may determine whether a certain UE (e.g., the UE 110) attempts data transmission on a contention basis by performing blind decoding on the contention-based control resource 13. For this, the contention-based control resource 13 may be placed at a certain location in the designated resource area 10 based on the number of UEs, traffic patterns of the UE, etc.

In an embodiment, the contention-based data resource 14 may be understood as a contention-based resource available for the UE 110 to transmit UL data. In an embodiment, the UE 110 may use not only the contention-based data resource 14 but also the available contention-based control resource 13 to transmit UL data. For example, the UE 110 may determine the contention-based control resource 13 to be used for transmitting control information, and the other contention-based control resource 13 than the determined contention-based control resource 13 may be used for the contention-based resource for transmitting UL data.

In an embodiment, the UE 110 may determine the size of the contention-based data resource 14 to be used for UL data transmission by itself. In an embodiment, the UE 110 may determine a relative area based on the contention-based control resource 13 in use as the contention-based data for UL data transmission. For example, the UE 110 may determine to use the first contention-based control resource 13 to transmit control information for UL data transmission. The UE 110 may determine to transmit UL data based on the first contention-based control resource 13 (e.g., a first corner) and using a contention-based resource corresponding to a rectangular area with the time axis x and the frequency axis y. In an embodiment, the information about a resource area determined by the UE 110 for UL data transmission, e.g., information about a location of the resource area or information about the x and y, may be included in the control information, and the UE 110 may transmit the control information to the BS 120.

In an embodiment, the UE 110 may determine the location of the resource area determined for UL data transmission by itself, or select it based on information included in the information (e.g., the resource map information) transmitted from the BS 120. For example, information about x and y ranges for determining a resource area for UL data transmission or information about an available (x, y) set may be transmitted from the BS 120 or pre-configured in e.g., prior radio resource control (RRC) information. The UE 110 may determine a resource area for UL data transmission based on information transmitted from the BS 120 or information pre-configured in the prior RRC information. In an embodiment, when the UE 110 determines a resource area for UL data transmission, the BS 120 may set a limit on determination of the resource area of the UE 110. For example, the BS 120 may limit the size or probability of transmission attempts of resources that may be used by the UE 110 to the utmost by taking into account the number of UEs currently connected to the cell, traffic patterns and the like to prevent resource collisions between the UEs. The limit may be included in the resource map information transmitted to the UE 110 from the BS 120 or may be preset in RRC information.

In an embodiment, the BS 120 may transmit many different pieces of resource map information to the UE 110. In this case, resource areas based on many different pieces of resource map information may be respectively independent areas separated along the frequency axis. In an embodiment, the BS 120 may configure each UE to use different resource map information when the plurality of UEs attempt contention-based data transmission. For example, based on the distance between the UE 110 and the BS 120, the BS 120 may configure a UE located at a different distance range to use different resource map information. In another example, the BS 120 may divide the UEs into multiple groups based on channel conditions, and UEs in different groups may be configured to use different resource map information. Allocating similar resources to UEs located at similar distances or having similar channel conditions may be helpful to communication performance of the whole communication system, so the performance of the whole communication system may be enhanced through the way described above.

Figure 5:
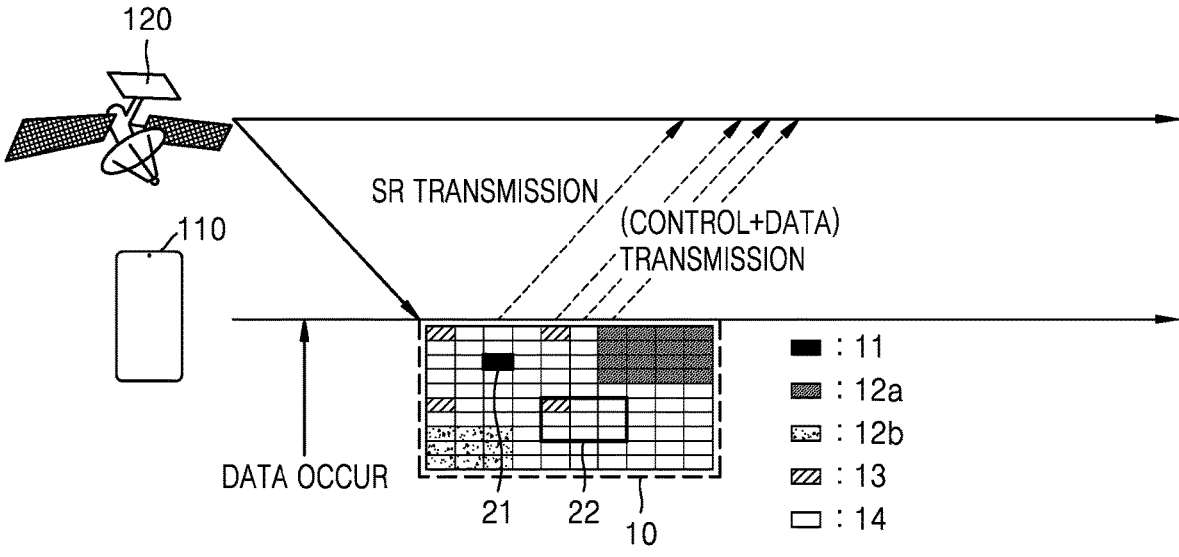
FIG. 5 illustrates UL data transmission of a UE based on resource map information, according to an embodiment.

FIG. 5 illustrates UL data transmission of a UE based on resource map information, according to an embodiment.

Referring to FIG. 5, when traffic occurs, the UE 110 may transmit, to the BS 120, at least a portion of UL data for handling the traffic, based on resource map information obtained from the BS 120.

In an embodiment, as described above in connection with FIG. 4, the resource map information obtained from the BS 120 may include information about the designated resource area 10, and the designated resource area 10 may include the scheduling request resource 11, the resource 12a occupied by the first UE, the resource 12b occupied by the second UE, the contention-based control resource 13 and the contention-based data resource 14.

In an embodiment, the UE 110 may use the scheduling request resource 11 allocated to notify traffic occurrence to transmit a scheduling request message. The UE 110 may determine a resource area for UL data transmission, and use the resource area to transmit control information and at least a portion of the UL data. In an embodiment, the dedicated resource area 10 may include a first resource area 21 for transmission of the scheduling request message and a second resource area 22 for transmission of the control information and at least a portion of the UL data. The first resource area 21 may not overlap the second resource area 22. The second resource area 22 may include at least one contention-based control resource 13. The UE 110 may use some of the at least one contention-based control resource 13 included in the second resource area 22 to transmit control information, and use the remaining resources other than the contention-based control resource 13 for transmission of the control information in the second resource area 22 to transmit the at least a portion of UL data.

In an embodiment, the UE 110 may compare the size of the UL data to handle the traffic that occurs with the size of the available contention-based resource.

In an embodiment, when the size of the UL data for handling the traffic that occurs is equal to or smaller than the size of the available contention-based resource, the UE 110 may use the available contention-based resource to transmit the whole UL data to the BS 120. In other words, in this case, the UE110 may transmit the scheduling request message, the control information and the whole UL data to the BS 120. The scheduling request message, the control information and the whole UL data may be transmitted to the BS 120 by the same signaling. In other words, the scheduling request message, the control information and the whole UL data may be transmitted to the BS 120 simultaneously. In this case, the control information may include self-scheduling information, and the self-scheduling information may include information about the size of the UL data to be transmitted. With this, the BS 120 that has successfully received the control information may obtain information about the size of the UL data even when reception of the UL data fails.

In an embodiment, when the size of the UL data for handling the traffic that occurs is larger than the size of the available contention-based resource, the UE 110 may use the available contention-based resource to transmit a portion of the UL data to the BS 120. In other words, in this case, the UE110 may transmit the scheduling request message and the control information to the BS 120 and transmit only a portion of the UL data corresponding to the size of the available contention-based resource to the BS 120. In this case, the UE 110 may add BSR information to the control information with the self-scheduling information. The self-scheduling information may include information about the size of a portion of the UL data to be transmitted, and the BSR information may include information about the size of whole UL data to be transmitted by the UE 110 or the size of the UL data that has failed to be transmitted but remains in the UE 110. In this case, the scheduling request message, the control information and a portion of the UL data may be transmitted to the BS 120 by signaling. In other words, the scheduling request message, the control information and the portion of the UL data may be transmitted to the BS 120 simultaneously. The BS 120 may obtain information about the size of a portion of the UL data transmitted by current signaling in the self-scheduling information and the BSR information, information about the size of the whole UL data to be transmitted by the UE 110 and information about the size of the UL data not yet transmitted from the UE 110. With this, the BS 120 that has successfully received the control information may obtain the information about the size of the UL data even when reception of the UL data fails.

In various embodiments, even when the scheduling request message, the control information and the UL data are transmitted simultaneously by the same signaling, robustness of transmission of each information may be different. In other words, the robustness of transmission of the scheduling request message may be higher than that of the control information, and the robustness of transmission of the control information may be higher than the robustness of transmission of the UL data. Hence, the BS has the highest chances of receiving the scheduling request message and the lowest chances of receiving the UL data.

As such, in an embodiment of the disclosure, the UE 110 may simultaneously transmit the control information and at least a portion of the UL data along with the scheduling request message, and accordingly, reduce the delay of transmission of UL data.

Figure 6A:
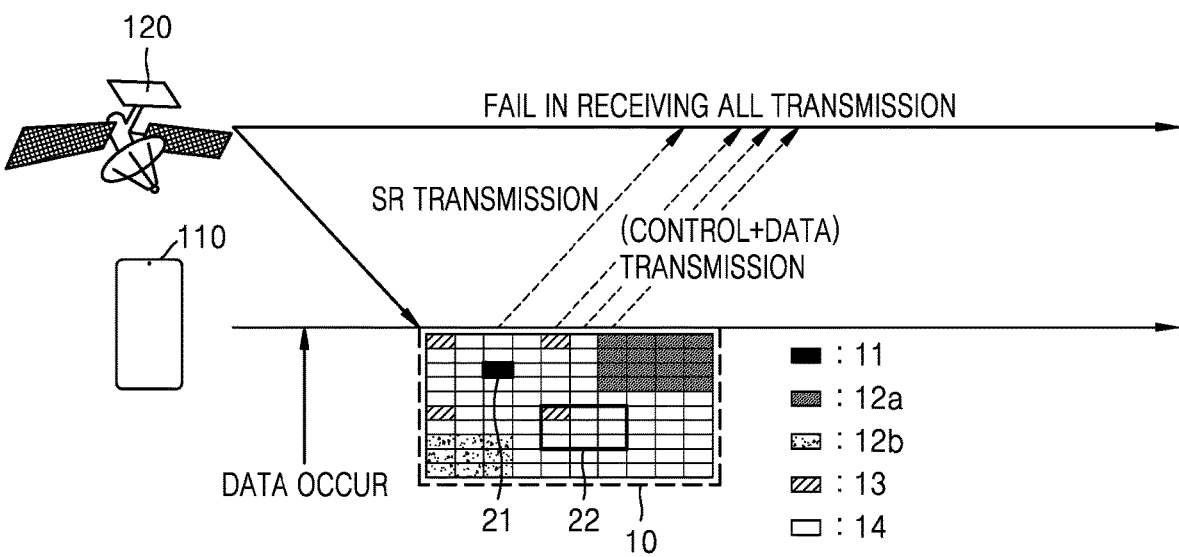
FIG. 6A illustrates an occasion when a BS fails to receive all signaling transmitted from a UE, according to an embodiment.
Figure 6B:
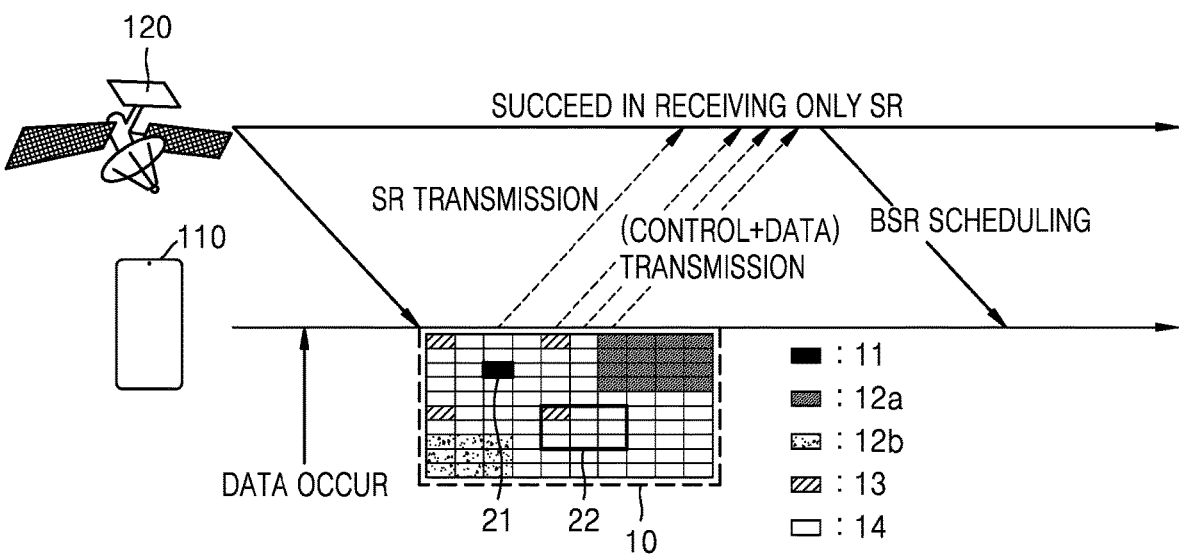
FIG. 6B illustrates an occasion when a BS receives a scheduling request message from a UE, according to an embodiment.
Figure 6C:
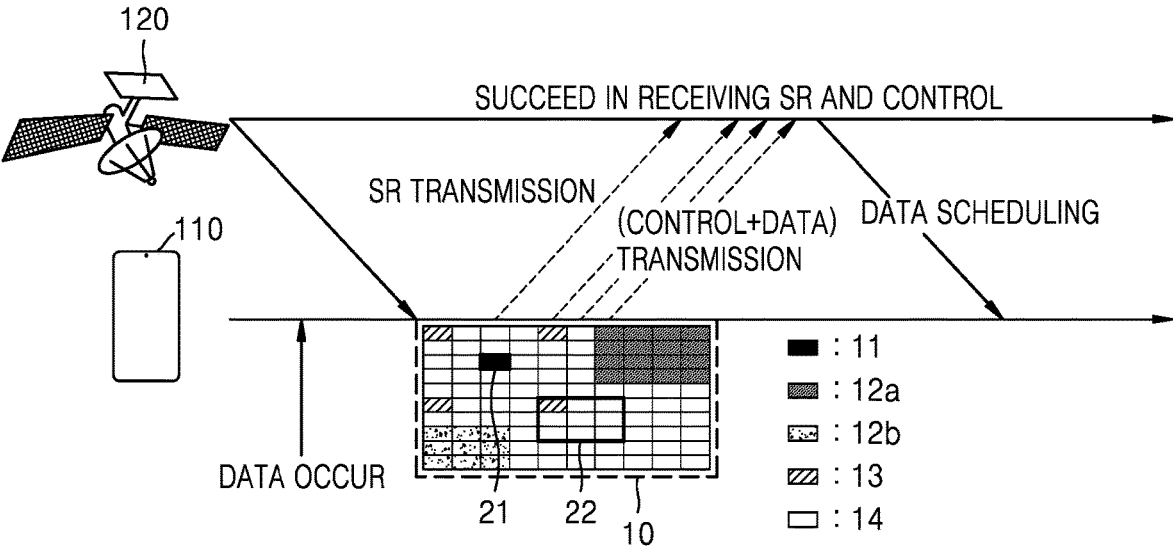
FIG. 6C illustrates an occasion when a BS receives a scheduling request message and control information from a UE, according to an embodiment.
Figure 6D:
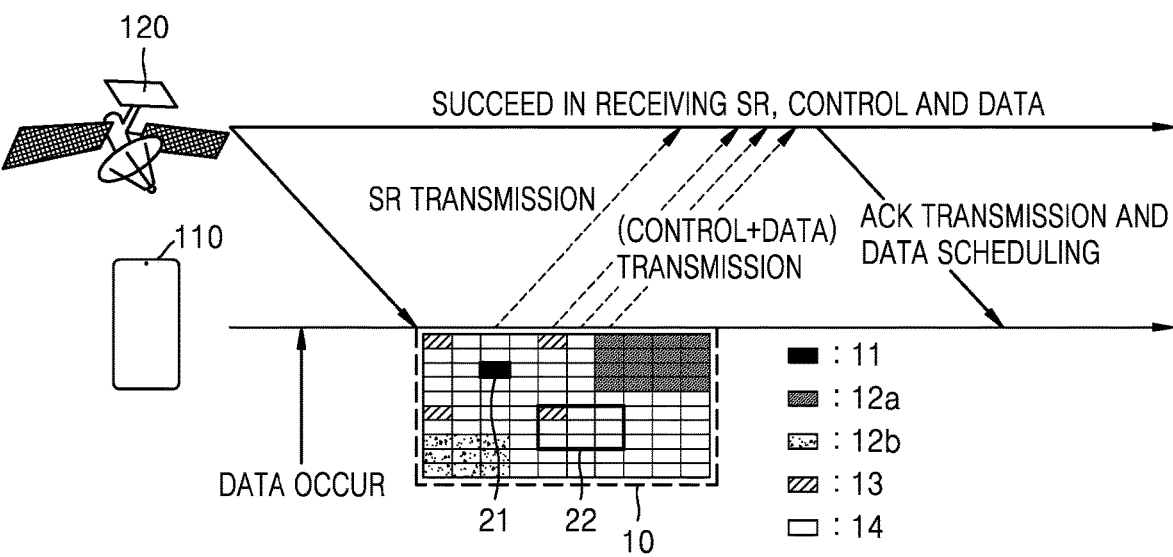
FIG. 6D illustrates an occasion when a BS receives a scheduling request message, control information, and at least a portion of UL data from a UE, according to an embodiment.

FIG. 6A illustrates an occasion when a BS fails to receive all signaling transmitted from a UE, according to an embodiment. FIG. 6B illustrates an occasion when a BS receives a scheduling request message from a UE, according to an embodiment. FIG. 6C illustrates an occasion when a BS receives a scheduling request message and control information from a UE, according to an embodiment. FIG. 6D illustrates an occasion when a BS receives a scheduling request message, control information, and at least a portion of UL data from a UE, according to an embodiment.

Referring to FIGS. 6A to 6D, the BS may succeed in receiving only a portion of information transmitted from the UE, e.g., the scheduling request message, the control information and the UL data, or succeed or fail in receiving the whole information. As described above in connection with FIG. 5, robustness of transmission of each of the scheduling request message, the control information and the UL data may be different. Hence, the BS may fail to receive all of the above information (FIG. 6A), only succeed in receiving the scheduling request message having the highest robustness among the information (FIG. 6B), only fail in receiving the UL data having the lowest robustness among the information (FIG. 6C) or succeed in receiving all the above information (FIG. 6D). In various embodiments, operation of the BS for the information transmitted from the UE may be different depending on what information it is that the BS succeeds in receiving.

Referring to FIG. 6A, the BS may fail to receive all the information transmitted from the UE, e.g., the scheduling request message, the control information and the UL data. In this case, the BS may not perform corresponding operation because it receives no signaling. The BS may periodically or non-periodically transmit the resource map information to the UE again, and wait until at least one of the scheduling request message, the control information and the UL data is successfully received.

Referring to FIG. 6B, the BS may only succeed in receiving the scheduling request message among the information transmitted from the UE, e.g., the scheduling request message, the control information and the UL data. The scheduling request message may be transmitted using a certain resource allocated with a particular location or a particular code at the particular location for each UE. The BS may attempt decoding the certain resources to determine whether each UE has transmitted the scheduling message, and accordingly determine that the scheduling request message has been received from a certain UE.

In an embodiment, as the BS failed to receive the control information and the UL data, the BS may not know an amount of UL data to be transmitted by the UE or an amount of resource required by the UE to transmit UL data. In this case, the UE may allocate a resource corresponding to the scheduling request message, and the allocated resource may be a resource for BSR transmission and may thus have a designated size or less.

Referring to FIG. 6C, among the information transmitted from the UE, e.g., the scheduling request message, the control information and the UL data, the BS may only succeed in receiving the scheduling request message and the control information but may fail in receiving the UL data. The control information may include information about a UE ID to indicate identification of the UE. For example, the control information may include self-scheduling information, and the self-scheduling information may include information about a UE ID. The BS may identify a UE from which the control information is transmitted, based on the information about the UE ID included in the received control information.

In an embodiment, as the BS succeeded in receiving the control information although failing to receive the UL data, the BS may obtain information about an amount of the UL data to be transmitted by the UE or an amount of resource required by the UE to transmit UL data. In various embodiments, the control information may or may not include BSR information.

In an embodiment, when the control information received from the UE includes no BSR information, the BS may determine that the UE has transmitted the whole UL data to handle the traffic that has occurred. In this case, the BS may use the self-scheduling information included in the control information to obtain information about an amount of resource required by the UE to transmit UL data. Specifically, the self-scheduling information may include information about a contention-based resource used for UL data transmission, e.g., information about a location, region or size of the contention-based resource, so the BS may obtain information about an amount of the resource required by the UE for UL data transmission. In this case, the BS may skip allocation of a resource for BSR transmission and determine to allocate a resource directly for UL data transmission.

In an embodiment, when the control information received from the UE includes BSR information, the BS may determine that the UE has transmitted only a portion of the UL data for handling the traffic that has occurred. In this case, the BS may use the self-scheduling information and the BSR information included in the control information to obtain information about an amount of resource required by the UE to transmit UL data. For example, the self-scheduling information may include information about a contention-based resource used for transmission of a portion of the UL data, e.g., information about a location, region or size of the contention-based resource, and the BSR information may include information about an amount of the resource required to transmit the remaining portion of the UL data. With this, the BS may obtain information about an amount of the resource required by the UE to transmit the whole UL data. In this case, the BS may skip allocation of a resource for BSR transmission and determine to allocate a resource directly for UL data transmission.

Referring to FIG. 6D, the BS may succeed in receiving all the information transmitted from the UE, e.g., the scheduling request message, the control information and the UL data. The UL data may be transmitted using a contention-based data resource, and an area of the contention-based data resource may neighbor on an area of the contention-based control resource. The BS may identify a UE that has transmitted control information based on the UE ID, and using this, the BS may also identify a UE that has transmitted the received UL data.

In an embodiment, when the BS receives UL data from the UE, the BS may transmit, to the UE, ACK corresponding to the scheduling request message of the UE no matter whether there is remaining UL data to be transmitted by the UE.

In various embodiments, the control information received from the UE may or may not include BSR information. In an embodiment, when the control information received from the UE includes no BSR information, the BS may determine that the UE has transmitted the whole UL data to handle the traffic that has occurred. In this case, the BS may determine that there is no more resource required by the UE, and determine not to allocate any resource to the UE. In an embodiment, when the control information received from the UE includes BSR information, the BS may determine that the UE has transmitted only a portion of the UL data for handling the traffic that has occurred. In this case, the BS may use the BSR information included in the control information to obtain information about an amount of more resources required by the UE to transmit the rest of the UL data. The BS may determine to allocate a resource to the UE based on the received BSR information.

Figure 7A:
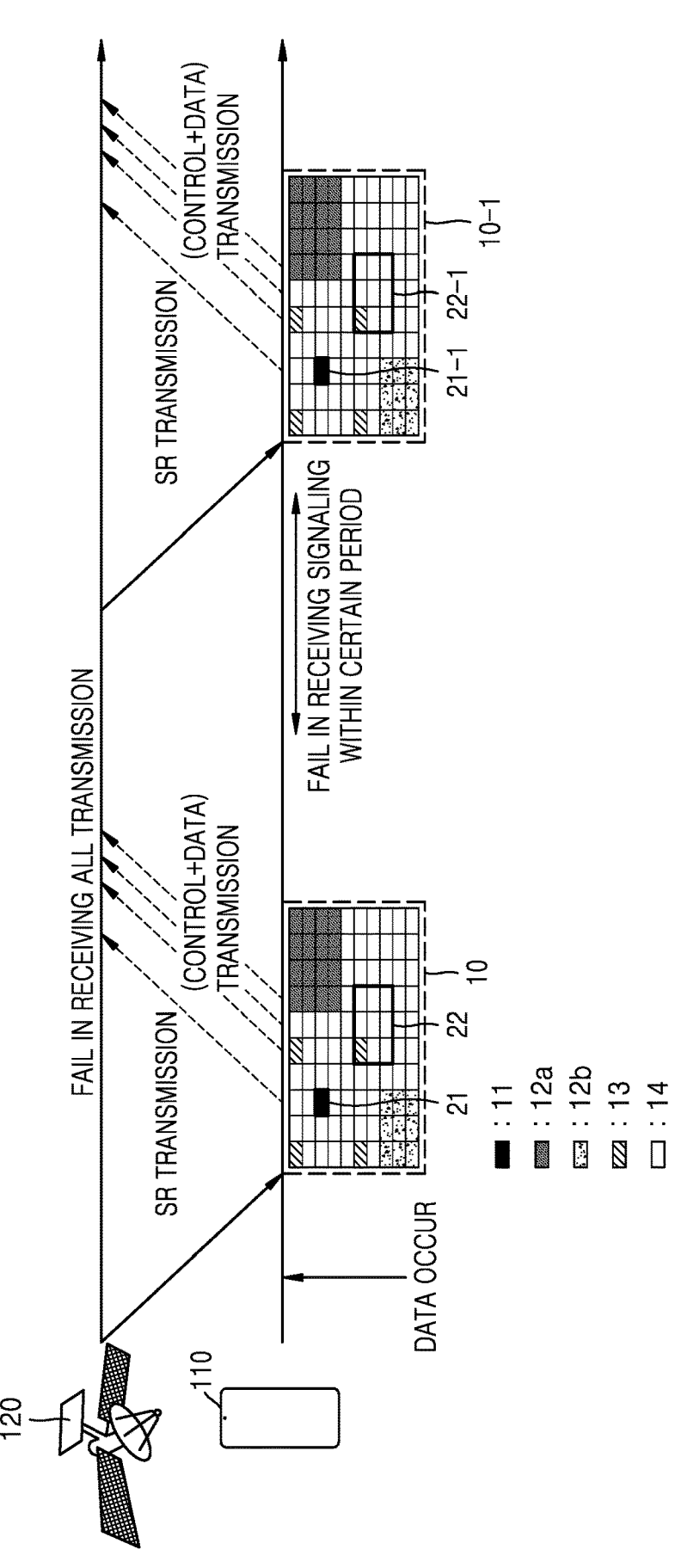
FIG. 7A illustrates operation of a UE on an occasion when a BS fails to receive all signaling transmitted from the UE, according to an embodiment.
Figure 7B:
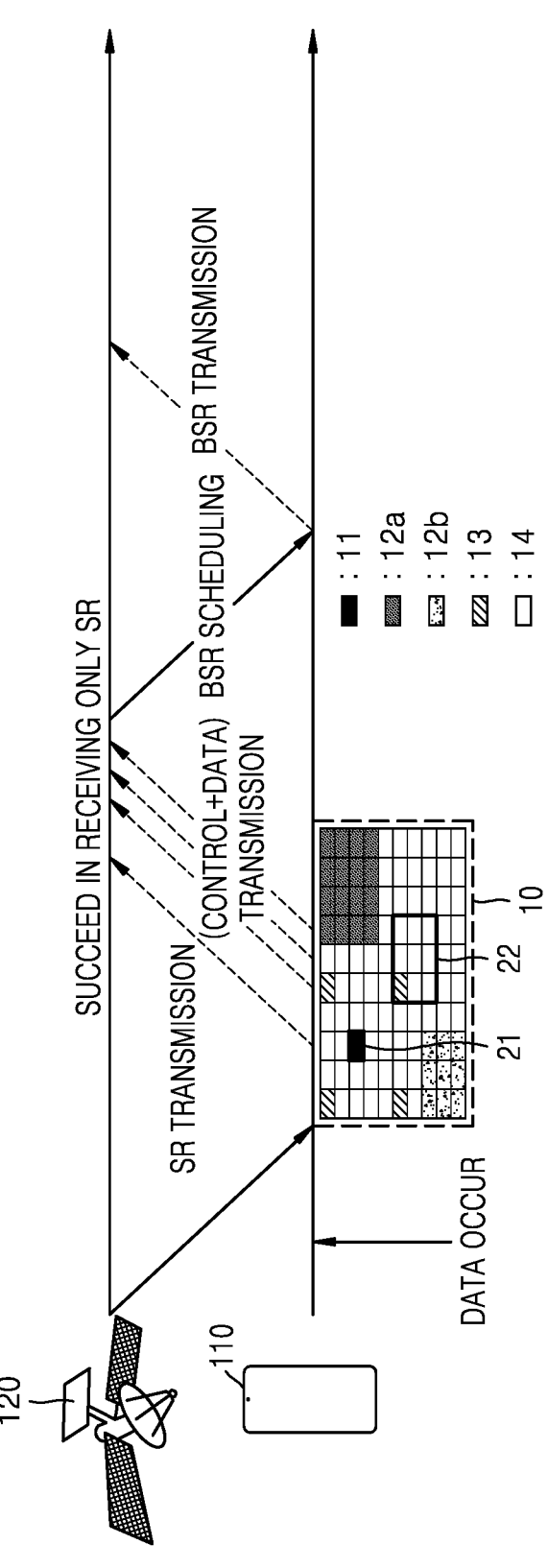
FIG. 7B illustrates operation of a UE on an occasion when a BS receives a scheduling request message from the UE, according to an embodiment.
Figure 7C:
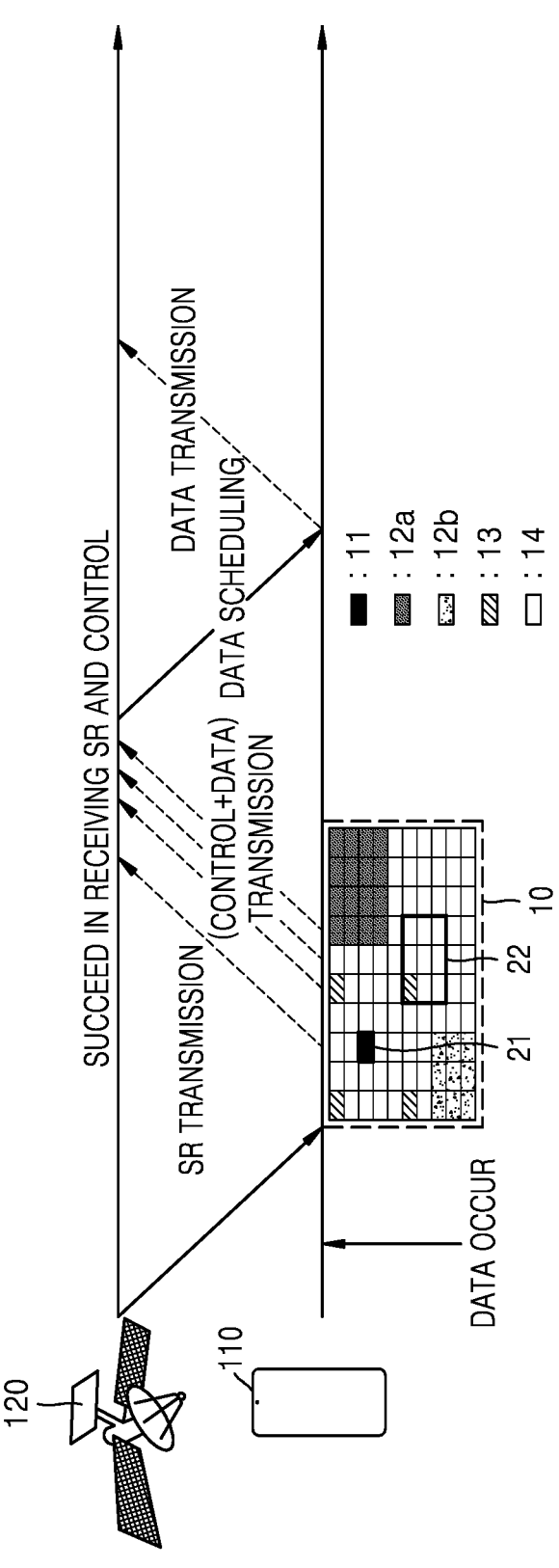
FIG. 7C illustrates operation of a UE on an occasion when a BS receives a scheduling request message and control information from the UE, according to an embodiment.
Figure 7D:
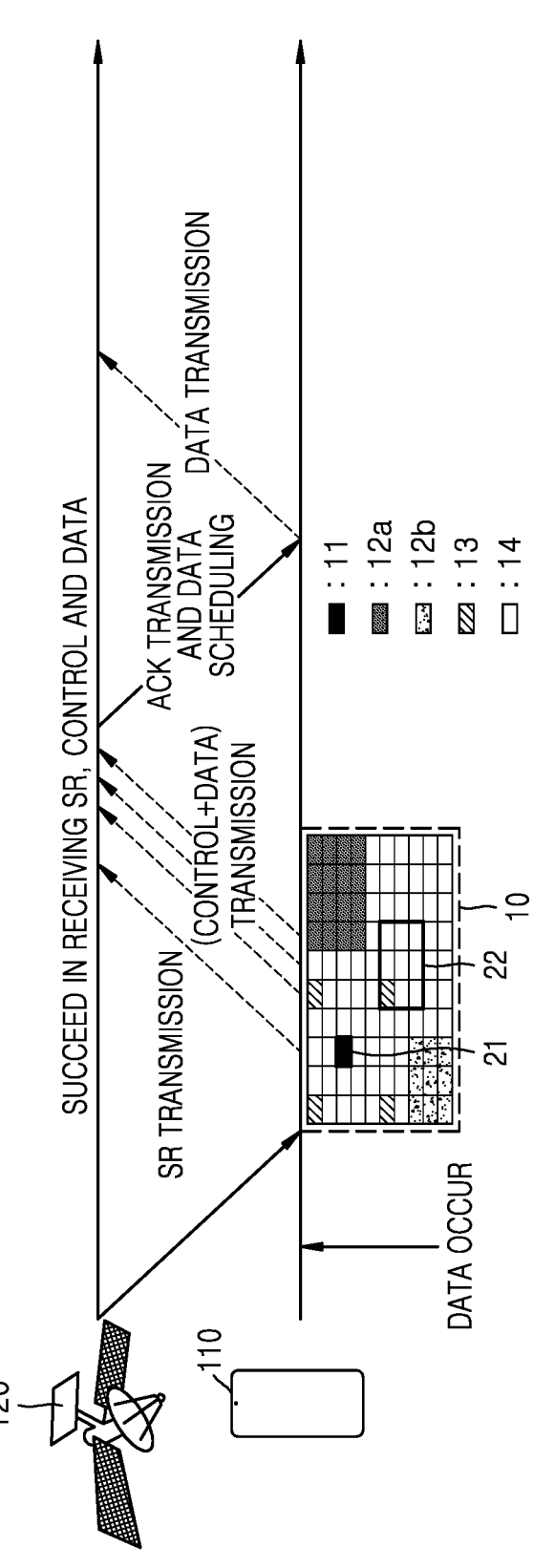
FIG. 7D illustrates operation of a UE on an occasion when a BS receives a scheduling request message, control information, and at least a portion of UL data from the UE, according to an embodiment.

FIG. 7A illustrates operation of a UE when a BS fails to receive all signaling transmitted from the UE, according to an embodiment. FIG. 7B illustrates operation of a UE when a BS receives a scheduling request message from the UE, according to an embodiment. FIG. 7C illustrates operation of a UE on an occasion when a BS receives a scheduling request message and control information from the UE, according to an embodiment. FIG. 7D illustrates operation of a UE on an occasion when a BS receives a scheduling request message, control information, and at least a portion of UL data from the UE, according to an embodiment.

Referring to FIGS. 7A to 7D, operation of the BS 120 may vary depending on whether each information transmitted from the UE 110 is received, and corresponding operation of the UE 110 may also vary depending on different operations of the BS 120. For example, when the BS 120 fails to receive all the information, the UE 110 may not receive any signaling from the BS 120 (FIG. 7A); when the BS 120 only succeeds in receiving the scheduling request message, the UE 110 may be allocated only a resource for the BSR from the BS 120 (FIG. 7B). Alternatively, when the BS 120 succeeds in receiving the scheduling request message and the control information, the UE 110 may be allocated a resource for the UL data (FIG. 7C); when the BS 120 succeeds in receiving all of the scheduling request message, control information and UL data, the UE 110 may receive ACK (FIG. 7D). In various embodiments, operation of the UE 110 may be different depending on signaling of the BS 120.

Referring to FIG. 7A, the BS 120 may fail to receive all the information transmitted from the UE 110, e.g., the scheduling request message, the control information and the UL data, and may not perform any signaling for the UE 110. In an embodiment, the UE 110 may determine whether a message related to the transmitted scheduling request message has been received from the BS 120 within a designated time. In an embodiment, when the message has not been received from the BS 120 within the designated time, the UE 110 may determine that transmission of the UL data as well as the previously transmitted scheduling request message and the control information has failed.

In an embodiment, the UE 110 may attempt retransmission because it determines that transmission of the previously transmitted information has failed. The UE 110 may re-obtain resource map information from the BS 120, and based on the re-obtained resource map information, retransmit the scheduling request message, the control information and the UL data to the BS 120. In an embodiment, the operation of retransmitting the information may be equal or similar to the previous operation of transmitting the information.

Referring to FIG. 7B, the BS 120 may only succeed in receiving the scheduling request message among the information transmitted from the UE 110, e.g., the scheduling request message, the control information and the UL data, and the UE 110 may be allocated a resource for BSR transmission without ACK from the BS 120 within the designated time. In an embodiment, the UE 110 may be allocated by the BS 120 a resource corresponding to the scheduling request message within a designated time, and may determine that the size of the allocated resource corresponds to at least a designated level. In this case, the UE 110 may determine that the allocated resource is a resource for BSR transmission, and determine that only the scheduling request message among the previously transmitted information has been received by the BS 120. Furthermore, the UE 110 may determine that the UL data transmission has failed because no ACK was received from the BS 120.

In an embodiment, as the UE 110 was allocated only the resource for BSR transmission, the UE 110 may transmit the BSR by using the allocated resource. In this case, the BS 120 may allocate a resource for UL data transmission based on the BSR transmitted from the UE 110, and the UE 110 may transmit UL data by using the allocated resource.

Referring to FIG. 7C, the BS 120 may succeed in receiving the scheduling request message and the control information among the information transmitted from the UE 110, e.g., the scheduling request message, the control information and the UL data, and the UE 110 may be allocated a resource without ACK from the BS 120 within the designated time. In an embodiment, the UE 110 may be allocated by the BS 120 a resource corresponding to the scheduling request message within a designated time, and may determine that the size of the allocated resource is larger than a designated level. In this case, the UE 110 may determine that the allocated resource is a resource for UL data transmission, and determine that the scheduling request message and the control information among the previously transmitted information have been received by the BS 120. Furthermore, the UE 110 may determine that the UL data transmission has failed because no ACK was received from the BS 120.

In an embodiment, as the UE 110 was allocated the resource for UL data transmission, the UE 110 may transmit UL data by using the allocated resource. In this case, the BS 120 may receive the UL data and transmit ACK to the UE 110. The UE 110 may receive the ACK and determine that the UL data transmission is successful.

Referring to FIG. 7D, the BS 120 may succeed in receiving all the information transmitted from the UE 110, e.g., the scheduling request message, the control information and the UL data, and the UE 110 may receive ACK from the BS 120 within a designated time. With the reception of the ACK, the UE 110 may determine that transmission of UL data as well as the scheduling request message and the control information is successful.

In an embodiment, the UE 110 may be allocated a resource along with reception of the ACK within the designated time. The allocated resource may be determined as corresponding to the request of the UE 110 for an inadequate resource when UL data is initially transmitted. In other words, in this case, the UE 110 may have additional UL data for transmission. The UE 110 may use the allocated resource to transmit, to the BS 120, the rest of the UL data that was not transmitted in the initial transmission.

Figure 8:
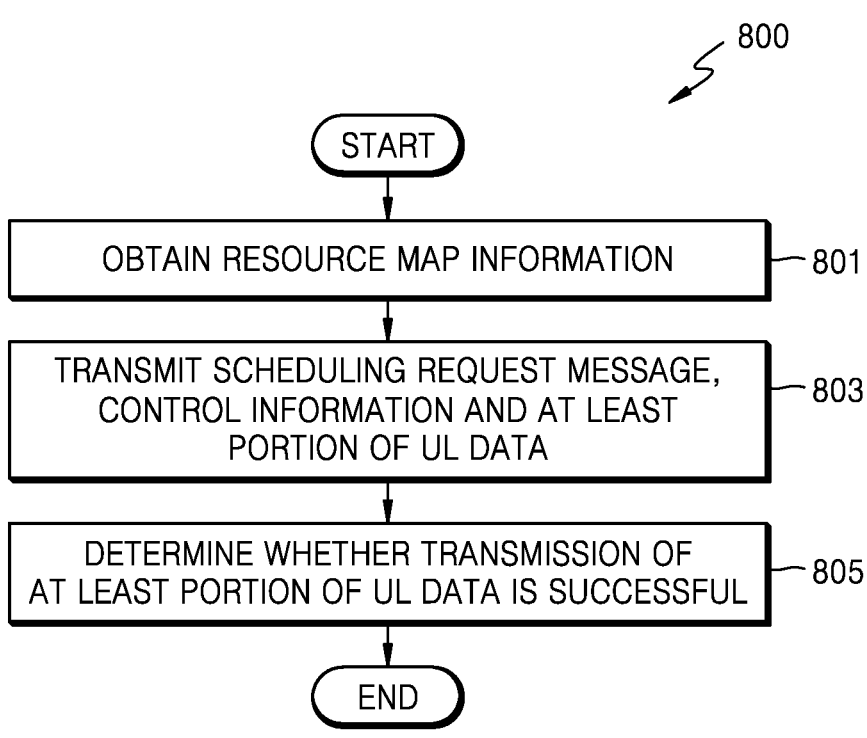
FIG. 8 is a flowchart illustrating a method by which a UE transmits, to a BS, UL data to handle traffic generated in a communication system, according to an embodiment.

FIG. 8 is a flowchart illustrating a method by which a UE transmits, to a BS, UL data to handle traffic generated in a communication system, according to an embodiment.

Referring to FIG. 8, a method 800 by which the UE transmits UL data to the BS in the communication system may include operations 801 to 805. In various embodiments, the method 800 is not limited to what is shown in FIG. 8, and may include an additional operation not shown in FIG. 8 or some of the operations shown in FIG. 8 may be omitted. In various embodiments, the method 800 may be understood as being performed by a UE (e.g., the UE 110 of FIG. 1) or a processor included in the UE (e.g., a processor 1030 of FIG. 10).

In operation 801, the UE may obtain resource map information from the BS. The resource map information may be information relating to an available contention-based resource. For example, the resource map information may include information about a location, region or size of the available contention-based resource in a designated resource area.

In operation 803, the UE may transmit at least a portion of UL data, control information and a scheduling request message based on the obtained resource map information. The control information may include information relating to a contention-based resource used to transmit the at least a portion of the UL data.

In an embodiment, the size of the available contention-based resource according to the resource map information may be smaller than the size of UL data to be transmitted by the UE, in which case the UE may transmit only a portion of the UL data along with the scheduling request message and the control information. In an embodiment, when the size of the available contention-based resource is smaller than the size of the UL data to be transmitted by the UE, the UE may transmit a BSR to the BS for the rest of the UL data that has not been transmitted.

In an embodiment, the UE may self-determine at least one of the location, the region and the size of a contention-based resource used for UL data transmission among the available contention-based resources. Information about the determined at least one of the location, the region and the size of the contention-based resource may be included in the control information and transmitted to the BS.

In operation 805, the UE may determine whether the transmission is successful for the at least a portion of the UL data transmitted to the BS. For example, the UE may determine whether a message related to the scheduling request message has been received from the BS within a designated time. When the UE has not received the message from the BS within the designated time, the UE may determine that the transmission has failed. In another example, the UE may receive ACK corresponding to the scheduling request message from the BS within a designated time, in which case the UE may determine that the transmission is successful. In another example, although not receiving the ACK corresponding to the scheduling request message from the BS within the designated time, the UE may be allocated a resource by the BS. In this case, the UE may determine that the UL data transmission has failed because it has not received ACK.

In various embodiments, the UE may determine whether the UL data transmission is successful, and may perform retransmission when it has failed. When receiving, from the BS, ACK for the retransmission, the UE may terminate the UL data transmission.

Figure 9:
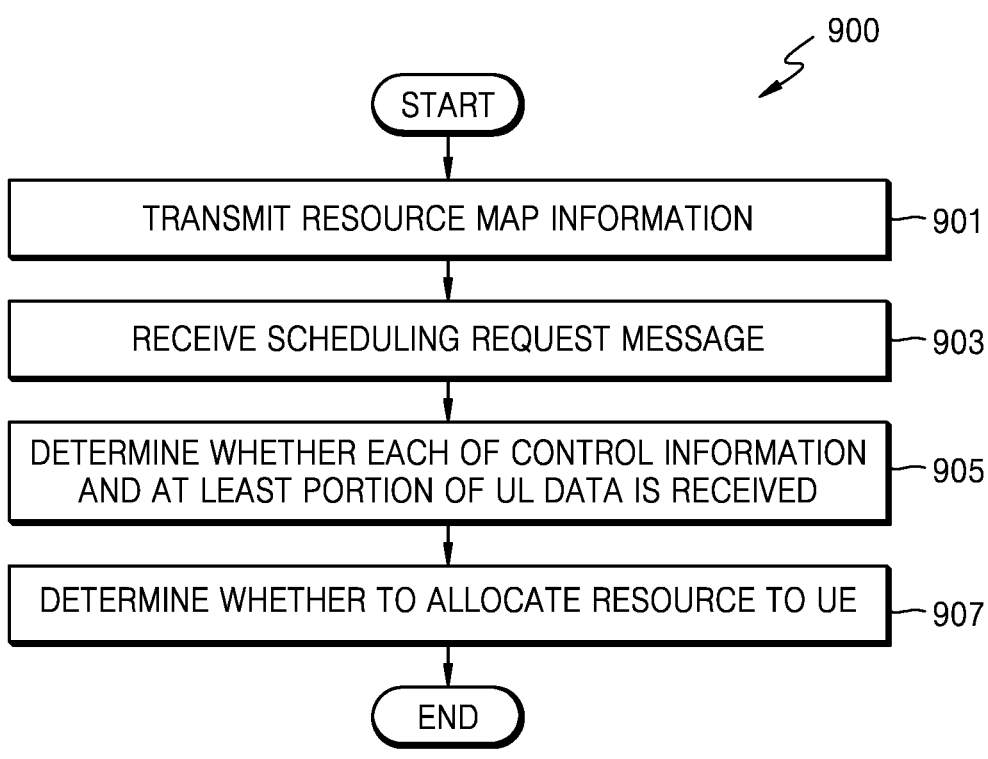
FIG. 9 is a flowchart illustrating a method by which a BS performs scheduling for UL data transmission of a UE in a communication system, according to an embodiment.

FIG. 9 is a flowchart illustrating a method by which a BS performs scheduling for UL data transmission of a UE in a communication system, according to an embodiment.

Referring to FIG. 9, a method 900 by which the BS performs scheduling for UL data transmission of the UE in the communication system may include operations 901 to 907. In various embodiments, the method 900 is not limited to what is shown in FIG. 9, and may include an additional operation not shown in FIG. 9 or some of the operations shown in FIG. 9 may be omitted. In various embodiments, the method 900 may be understood as being performed by a BS (e.g., the BS 120 of FIG. 1) or a processor included in the BS (e.g., a processor 1130 of FIG. 11).

In operation 901, the BS may transmit resource map information to the UE. The resource map information may be information relating to an available contention-based resource. For example, the resource map information may include information about a location, region or size of the available contention-based resource in a designated resource area. The BS may transmit the resource map information periodically or non-periodically.

In operation 903, the BS may receive a scheduling request message from the UE. In an embodiment, the BS may receive the scheduling request message and identify a UE that transmitted the received scheduling request message.

In operation 905, the BS may determine whether the control information has been received and whether the UL data has been received. In an embodiment, the BS may not receive both the control information and the UL data, or may receive a portion of the UL data and the control information, or may receive both the control information and the UL data.

In operation 907, the BS may determine whether to allocate a resource to the UE. In various embodiments, the BS may determine whether to allocate a resource to the UE based on at least whether the control information has been received and whether the UL data has been received. For example, when both the control information and the UL data have not been received, the BS may determine to allocate a resource for BSR transmission to the UE. In another example, when only the control information is received, the BS may determine to allocate a resource of a size required by the UE for UL data transmission to the UE. In another example, when both the control information and the UL data are received, the BS may transmit ACK to the UE, and determine whether to allocate a resource based on whether the control information includes a BSR. For example, when the control information includes a BSR, the BS may determine that the UE requires an additional resource and determine to allocate a resource to the UE.

Figure 10:
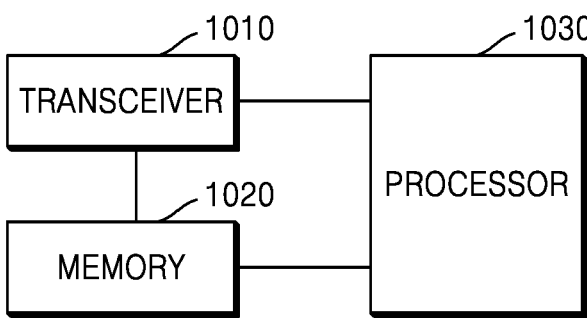
FIG. 10 is a block diagram of a UE, according to an embodiment.

FIG. 10 is a block diagram of a UE, according to an embodiment.

Referring to FIG. 10, the UE in the disclosure may include a processor 1030, a transceiver 1010, and a memory 1020. Components of the UE are not, however, limited thereto. For example, the UE may include more elements than described above or include fewer elements than described above. In addition, the transceiver 1010, the memory 1020, and the processor 1030 may be implemented in a single chip.

In an embodiment, the processor 1030 may control a series of processes for the UE to be operated according to the aforementioned embodiments of the disclosure. For example, the processor 1030 may control the components of the UE to transmit UL data according to the embodiments of the disclosure. The processor 1030 may be provided in the plural, which may perform the aforementioned operation for transmitting UL data of the disclosure by carrying out a program stored in the memory 1020.

The transceiver 1010 may transmit or receive signals to or from a BS. The signals to be transmitted to or received from the BS may include control information and data. The transceiver 1010 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 1010 are not limited to the RF transmitter and RF receiver. In addition, the transceiver 1010 may receive a signal on a wireless channel and output the signal to the processor 1030, and transmit a signal output from the processor 1030 on a wireless channel.

In an embodiment, the memory 1020 may store a program and data required for operation of the UE. Furthermore, the memory 1020 may store control information or data included in a signal transmitted or received by the UE. The memory 1020 may include a storage medium such as a read only memory (ROM), a random-access memory (RAM), a hard disk, a compact disc ROM (CD-ROM), and a digital versatile disk (DVD), or a combination of storage mediums. Moreover, the memory 1020 may be in the plural. In an embodiment, the memory 1020 may store a program to perform the aforementioned operation of transmitting UL data of the aforementioned embodiments of the disclosure.

Figure 11:
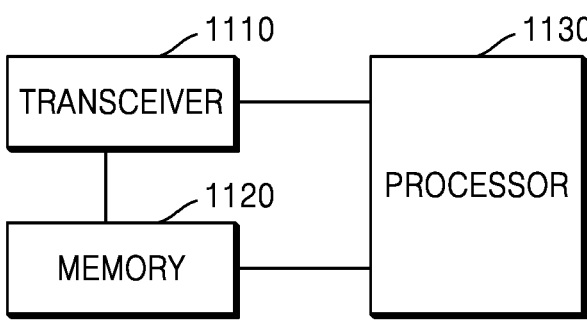
FIG. 11 is a block diagram of a BS, according to an embodiment.
Figure 12:
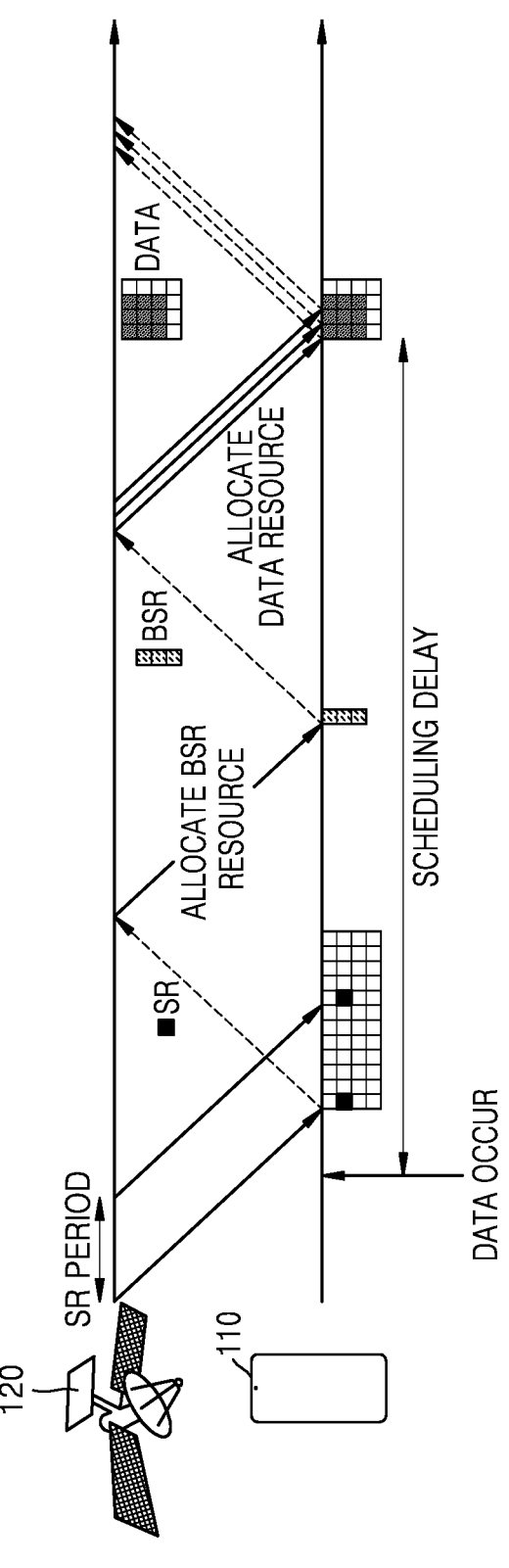
FIG. 12 illustrates an existing scheduling-based data transfer method in non-terrestrial communication.

FIG. 11 is a block diagram of a BS, according to an embodiment.

Referring to FIG. 11, the BS of the disclosure may include a processor 1130, a transceiver 1110, and a memory 1120. Components of the BS are not, however, limited thereto. For example, the BS may include more or fewer elements than described above. In addition, the processor 1130, the transceiver 1110, and the memory 1120 may be implemented in a single chip.

The processor 1130 may control a series of processes for the BS to be operated according to the embodiments of the disclosure. For example, the processor 330 may control the components of the BS for the UE to perform the operation of transmitting UL data in a wireless communication system according to embodiments of the disclosure. The processor 1130 may be provided in the plural, which may perform the aforementioned operation of the BS allowing the UE in the communication system of the disclosure to transmit UL data by carrying out a program stored in the memory 1120.

The transceiver 1110 may transmit or receive signals to or from a UE. The signals to be transmitted to or received from the UE may include control information and data. The transceiver 1110 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 1110 are not limited to the RF transmitter and RF receiver. In addition, the transceiver 1110 may receive a signal on a wireless channel and output the signal to the processor 1130, and transmit a signal output from the processor 1130 on a wireless channel.

In an embodiment, the memory 1120 may store a program and data required for operation of the BS. Furthermore, the memory 1120 may store control information or data included in a signal transmitted or received by the BS. The memory 1120 may include a storage medium such as a ROM, a RAM, a hard disk, a CD-ROM, and a DVD, or a combination of storage mediums. Moreover, the memory 1120 may be in the plural. In an embodiment, the memory 1120 may store a program for operations of the BS allowing the UE to perform an operation to transmit UL data in the communication system in the aforementioned embodiments of the disclosure.

According to an embodiment of the disclosure, a method by which a UE transmits UL data to a BS to handle traffic which occurs in a communication system may include obtaining resource map information relating to an available contention-based resource from the BS, transmitting, to the BS, a scheduling request message, control information and at least a portion of the UL data based on the resource map information, and determining whether the at least a portion of the UL data is successfully transmitted, wherein the control information includes information relating to a contention-based resource used to transmit the at least a portion of the UL data.

In an embodiment, the method may further include determining at least one of a location, a range and a size of the contention-based resource in use, based on the resource map information.

In an embodiment, the method may further include comparing a size of the UL data with a size of the available contention-based resource, and transmitting a BSR to the BS when the size of the UL data is larger than the size of the available contention-based resource.

In an embodiment, the method may further include determining whether a message related to the scheduling request message has been received from the BS within a designated time, and determining that transmission of the at least a portion of the UL data has failed, based on a determination that the message has not been received from the BS within the designated time. In an embodiment, the method may further include re-obtaining resource map information relating to the available contention-based resource from the BS, and retransmitting the scheduling request message, the at least a portion of the UL data and the control information to the BS based on the re-obtained resource map information.

In an embodiment, the method may further include receiving allocation of a resource corresponding to the scheduling request message from the BS within a designated time, and determining that transmission of the at least a portion of the UL data has failed and transmitting a BSR to the BS when a size of the allocated resource corresponds to at least a designated level.

In an embodiment, the method may further include determining that transmission of the at least a portion of the UL data is successful when receiving, from the BS, ACK corresponding to the scheduling request message within a designated time. In an embodiment, the method may further include receiving allocation of a resource corresponding to the scheduling request message from the BS within the designated time, and using the allocated resource to transmit, to the BS, the rest of the UL data other than the at least a portion.

In an embodiment, the method may further include determining that transmission of the at least a portion of the UL data has failed when receiving allocation of a resource corresponding to the scheduling request message without receiving ACK corresponding to the scheduling request message from the BS within a designated time, and using the allocated resource to transmit the UL data to the BS.

In an embodiment, transmission of the scheduling request message may have higher robustness than transmission of the control signal, and the transmission of the control information may have higher robustness than transmission of the at least a port of the UL data.

According to an embodiment of the disclosure, a method by which a BS performs scheduling for UL data transmission of a UE in a communication system includes transmitting, to the UE, resource map information relating to an available contention-based resource, receiving a scheduling request message from the UE, determining whether each of control information and at least a portion of the UL data is received, and determining whether to allocate a resource for the UE based on whether the control information is received and whether the at least a portion of the UL data is received, wherein the control information includes information relating to a contention-based resource determined to be used by the UE to transmit the at least a portion of the UL data.

In an embodiment, the method may further include transmitting ACK corresponding to the scheduling request message to the UE when determining that the control information and the at least a portion of the UL data are received. In an embodiment, the method may further include determining to allocate a resource to the UE based on a BSR when the received control information includes the BSR. In an embodiment, the method may further include determining not to allocate a resource to the UE when the received control information does not include any BSR.

In an embodiment, the method may further include determining to allocate a resource to the UE when it is determined that the control information is received and that the at least a portion of the UL data is not received. In an embodiment, a size of the resource allocated to the UE may be determined based on information about the contention-based resource and a BSR included in the control information when the BSR is included in the received control information. In an embodiment, a size of the resource allocated to the UE may be determined based on information about the contention-based resource included in the control information when a BSR is not included in the received control information.

According to an embodiment of the disclosure, a UE for transmitting, to a BS, UL data to process traffic generated in a communication system includes a transceiver configured to transmit the UL data to the BS, and at least one processor coupled to the transceiver, the at least one processor configured to obtain resource map information relating to an available contention-based resource from the BS, transmit, to the BS, a scheduling request message, control information and at least a portion of the UL data based on the resource map information, and determine whether the at least a portion of the UL data is successfully transmitted, wherein the control information includes information relating to a contention-based resource used to transmit the at least a portion of the UL data.

In an embodiment, the at least one processor is configured to determine at least one of a location, a range and a size of the contention-based resource in use, based on the resource map information.

In an embodiment, the at least one processor is configured to compare a size of the UL data with a size of the available contention-based resource and transmit a BSR to the BS when the size of the UL data is larger than the size of the available contention-based resource.

It is understood that various embodiments of the disclosure and associated terms are not intended to limit technical features herein to particular embodiments, but encompass various changes, equivalents, or substitutions. Like reference numerals may be used for like or related elements throughout the drawings. The singular form of a noun corresponding to an item may include one or more items unless the context states otherwise. Throughout the specification, "A or B", "at least one of A and B", "at least one of A or B", "A, B or C", "at least one of A, B and C", and "A, B, or C" may each include any one or all the possible combinations of A, B and C. Terms like "first", "second", etc., may be simply used to distinguish an element from another, without limiting the elements in a certain sense (e.g., in terms of importance or order). When an element is mentioned as being "coupled" or "connected" to another element with or without an adverb "functionally", "electrically" or "operatively", it means that the element may be connected to the other element directly (e.g., wiredly), wirelessly, or through a third element.

In various embodiments of the disclosure, the term "module", "device", "member", or "block" may refer to a unit implemented in hardware, software, or firmware, and may be interchangeably used with e.g., logic, logic block, part, or circuit. The module may be an integral part that performs one or more functions, or a minimum unit or a portion of the part. For example, in an embodiment, the module may be implemented in the form of an application-specific integrated circuit (ASIC).

Various embodiments of the disclosure may be implemented in software including one or more instructions stored in a machine-readable storage medium. For example, a processor of the machine may call at least one of the stored one or more instructions from the storage medium. This enables the machine to be operated to perform at least one function according to at least one instruction called. The one or more instructions may include codes created by a compiler or codes that may be executed by an interpreter. The computer-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a CD-ROM), through an application store (e.g., Play Store™), directly between two user devices (e.g., smart phones), or online (e.g., downloaded or uploaded). In the case of online distribution, at least part of the computer program product may be at least temporarily stored or arbitrarily created in a storage medium that may be readable to a device such as a server of the manufacturer, a server of the application store, or a relay server.

In various embodiments, each of the aforementioned components (e.g., a module or a program) may include a single entity or multiple entities, and some of the multiple entities may be separately arranged in another component. In various embodiments, one or more of the aforementioned components or operations may be omitted, or one or more of other components or operations may be added. Alternatively or additionally, a plurality of components (e.g., modules or programs) may be integrated into a single component. In this case, the integrated component may perform one or more functions of the respective components therein equally or similarly to what are performed by the plurality of components before integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method performed by a user equipment (UE) for reducing scheduling delay of the UE in a non-terrestrial (NTN) communication system, the method comprising:

obtaining, from a base station (BS), resource map information relating to an available contention-based resource, wherein the available contention-based resource has a resource structure based on an NTN standard and includes a scheduling request resource, a contention-based control resource, and a contention-based data resource;

transmitting, to the BS, a scheduling request message, control information and at least a portion of uplink (UL) data, based on the resource map information; and determining whether the at least a portion of the UL data is successfully transmitted, wherein the control information comprises information relating to a contention-based resource used to transmit the at least a portion of the UL data.

2. The method of claim 1, further comprising:

determining, based on the resource map information, at least one of:

a location of the contention-based resource used to transmit the at least a portion of the UL data, a region of the contention-based resource used to transmit the at least a portion of the UL data, and a size of the contention-based resource used to transmit the at least a portion of the UL data.

3. The method of claim 1, further comprising:

comparing a size of the UL data with a size of the available contention-based resource; and in case that the size of the UL data is larger than the size of the available contention-based resource, transmitting a buffer status report (BSR) to the BS.

4. The method of claim 1, further comprising:

determining whether a message related to the scheduling request message has been received from the BS within a designated time; and based on a determination that the message related to the scheduling request message has not been received from the BS within the designated time, determining that transmission of the at least a portion of the UL data has failed.

5. The method of claim 4, further comprising:

re-obtaining, from the BS, resource map information relating to the available contention-based resource; and retransmitting, to the BS, the scheduling request message, the at least a portion of the UL data and the control information, based on the resource map information re-obtained.

6. The method of claim 1, further comprising:

receiving, from the BS, an allocation of a resource corresponding to the scheduling request message within a designated time; and in case that a size of the allocated resource is same as or smaller than a designated level, determining that transmission of the at least a portion of the UL data has failed and transmitting a BSR to the BS.

7. The method of claim 1, further comprising:

in case of receiving, from the BS, an acknowledgment (ACK) corresponding to the scheduling request message within a designated time, determining that transmission of the at least a portion of the UL data is successful.

8. The method of claim 7, further comprising:

receiving, from the BS, an allocation of a resource corresponding to the scheduling request message within the designated time; and transmitting, to the BS, using the allocated resource, the remaining portion of the UL data.

9. The method of claim 1, further comprising:

in case of receiving an allocation of a resource corresponding to the scheduling request message without receiving, from the BS, an acknowledgment (ACK) corresponding to the scheduling request message within a designated time, determining that transmission of the at least a portion of the UL data has failed; and transmitting the UL data to the BS, using the allocated resource.

10. The method of claim 1, wherein robustness of transmission of the scheduling request message is higher than the robustness of transmission of the control information, and wherein the robustness of transmission of the control information is higher than the robustness of transmission of the at least a portion of the UL data.

11. A method performed by a base station (BS) for reducing scheduling delay of a user equipment (UE) in a non-terrestrial (NTN) communication system, the method comprising:

transmitting, to the UE, resource map information relating to an available contention-based resource, wherein the available contention-based resource has a resource structure based on an NTN standard and includes a scheduling request resource, a contention-based control resource, and a contention-based data resource;

receiving, from the UE, a scheduling request message;

determining whether each of control information and at least a portion of uplink (UL) data is received; and determining whether to allocate a resource for the UE, based on whether the control information is received and whether the at least a portion of the UL data is received, wherein the control information comprises information relating to a contention-based resource determined to be used by the UE to transmit the at least a portion of the UL data.

12. The method of claim 11, further comprising:

in case of determining that the control information and the at least a portion of the UL data are received, transmitting, to the UE, an acknowledgment (ACK) corresponding to the scheduling request message.

13. The method of claim 12, further comprising:

in case that the received control information includes a buffer status report (BSR), determining to allocate a resource to the UE, based on the BSR.

14. The method of claim 12, further comprising:

in case that the received control information does not include any BSR, determining not to allocate a resource to the UE.

15. The method of claim 11, further comprising:

in case that it is determined that the control information is received and that the at least a portion of the UL data is not received, determining to allocate a resource to the UE.

16. A user equipment (UE) for reducing scheduling delay of the UE in a non-terrestrial (NTN) communication system, the UE comprising:

at least one transceiver;

at least one processor communicatively coupled to the at least one transceiver; and at least one memory, communicatively coupled to the at least one processor, storing instructions executable by the at least one processor to cause the UE to:

obtain, from a base station (BS), resource map information relating to an available contention-based resource, wherein the available contention-based resource has a resource structure based on an NTN standard and includes a scheduling request resource, a contention-based control resource, and a contention-based data resource, transmit, to the BS, a scheduling request message, control information and at least a portion of uplink (UL) data, based on the resource map information, and determine whether the at least a portion of the UL data is successfully transmitted, wherein the control information comprises information relating to a contention-based resource used to transmit the at least a portion of the UL data.

17. A base station (BS) for reducing scheduling delay of a user equipment (UE) in a non-terrestrial (NTN) communication system, the BS comprising:

at least one transceiver;

at least one processor communicatively coupled to the at least one transceiver; and at least one memory, communicatively coupled to the at least one processor, storing instructions executable by the at least one processor to cause the BS to:

transmit, to the UE, resource map information relating to an available contention-based resource, wherein the available contention-based resource has a resource structure based on an NTN standard and includes a scheduling request resource, a contention-based control resource, and a contention-based data resource, receive, from the UE, a scheduling request message, determine whether each of control information and at least a portion of uplink (UL) data is received, and determine whether to allocate a resource for the UE, based on whether the control information is received and whether the at least a portion of the UL data is received, wherein the control information comprises information relating to a contention-based resource determined to be used by the UE to transmit the at least a portion of the UL data.

* * * * *